United States Patent [19]

Bernstein

[11] Patent Number: 5,711,607
[45] Date of Patent: Jan. 27, 1998

[54] TEMPERATURE MEASUREMENT TECHNIQUE WITH AUTOMATIC VERIFICATION OF CONTACT BETWEEN PROBE AND OBJECT

[75] Inventor: Daniel Bernstein, Redwood City, Calif.

[73] Assignee: Argonaut Technologies, Inc., San Carlos, Calif.

[21] Appl. No.: 566,525

[22] Filed: Dec. 4, 1995

[51] Int. Cl.[6] ................................................. G01K 7/00
[52] U.S. Cl. ............................................................ 374/179
[58] Field of Search .................................. 374/179, 165, 374/120; 136/221, 225, 236.1

[56] References Cited

U.S. PATENT DOCUMENTS

| | | | |
|---|---|---|---|
| 3,049,012 | 8/1962 | Daniels | 374/179 |
| 3,874,239 | 4/1975 | Finney | 374/179 |
| 4,110,124 | 8/1978 | Robertson et al. | 136/236 |
| 4,164,433 | 8/1979 | Granahan et al. | 136/229 |
| 4,265,117 | 5/1981 | Thoma et al. | 374/165 |
| 4,279,154 | 7/1981 | Nakamura | 136/221 |
| 4,419,023 | 12/1983 | Hager | 374/179 |
| 4,477,687 | 10/1984 | Finney | 136/229 |
| 4,795,498 | 1/1989 | Germanton et al. | 374/179 |
| 5,033,866 | 7/1991 | Kehl et al. | 374/179 |
| 5,370,459 | 12/1994 | Culbertson et al. | 374/208 |
| 5,382,093 | 1/1995 | Dutcher | 374/208 |

OTHER PUBLICATIONS

Omega Complete Temperature Measurement Handbook and Encyclopedia®, Omega Engineering, Inc., vol. 29, 1995, pp. Z-15, Z-151.

Primary Examiner—George M. Dombroske
Assistant Examiner—William L. Oen
Attorney, Agent, or Firm—Townsend and Townsend and Crew LLP

[57] ABSTRACT

A temperature sensor that provides an electrical signal that is a known function of temperature. A conductive surface of the object whose temperature is to be measured is incorporated into the electrical circuit that measures the temperature-dependent electrical signal. If the surface is not electrically conductive, a thermally and electrically conductive region is provided, as by plating the surface or bonding a thin sheet of conductive material to the surface. The conductive portion of the surface is contacted at a first location by a portion of the sensor, and at a second, spatially distinct, location by a conductor that is needed to complete the electrical circuit. Unless electrical contact is established at both of these locations, the result is a condition that is readily identifiable. Since electrical contact will only be made if there is good thermal contact, thermal contact is verified by verifying the electrical contact as part of the measurement.

19 Claims, 3 Drawing Sheets

TEMPERATURE MEASUREMENT TECHNIQUE WITH AUTOMATIC VERIFICATION OF CONTACT BETWEEN PROBE AND OBJECT

BACKGROUND OF THE INVENTION

The present invention relates generally to temperature monitoring, and more specifically to the use of contact probes for such monitoring.

Many industrial processes require that a particular temperature be closely monitored and controlled. For example, it is important in certain chemical processes that the temperature of reagents in a reaction vessel be known at all times during the process. A wide variety of temperature monitoring techniques have been developed, including the use of thermocouples.

A thermocouple is a device that relies on the thermoelectric effect wherein a temperature gradient between two ends of a wire gives rise to a voltage gradient. The relation between the temperature gradient and the voltage gradient differs from metal to metal. Therefore, if the respective first ends of two wires of dissimilar metals are joined and held at a first temperature, and the respective second ends are held at a second temperature, the voltage between the second ends will be a function of the temperature difference between the first and second temperatures. The first temperature is typically the temperature to be measured; the second temperature a reference temperature. Thus, the joined ends of the wires can be considered to be a temperature probe.

Since the act of measuring the voltage at the second ends results in the formation of an additional thermocouple junction at one or both of the second ends, the actual measured voltage is the desired voltage less a voltage due to the junction at the second ends. This must be compensated so the temperature at the first end can be determined.

Thermocouple devices are used to measure temperatures in a wide variety of industrial settings. A thermocouple probe is placed in the substance (e.g., molten metal) whose temperature is to be measured, placed in contact with a surface whose temperature is to be measured, or placed in an ambient atmosphere whose temperature is to be measured.

Consider the problem of measuring the temperature of a substance in a pipe or a closed vessel. If it is possible to immerse the probe in the substance, thermal contact is virtually assured, and a reliable direct measurement can be obtained. Where it is impractical to make direct contact with the substance, it sometimes suffices to measure the outside temperature of the pipe or vessel. However, making good thermal contact with the surface can be problematical. U.S. Pat. Nos. 4,164,433 and 4,477,687 show two examples of prior art techniques for welding thermocouple probes to the exterior surfaces of pipes.

Nevertheless, for those situations where it is not practical to permanently fasten the probe to the surface to be measured, the problem of thermal contact remains. The problem is further complicated by the fact that it is typically difficult to verify the quality of the contact between the probe and the surface. The measurement itself gives no indication of the quality of the contact; the thermocouple will provide an output voltage, and hence an apparently reliable measurement, even if the contact is poor or nonexistent.

SUMMARY OF THE INVENTION

The present invention provides reliable temperature measurements without having to bond temperature sensing probes to the surface of objects being measured. The invention further provides verification of the reliability of the measurement.

In short, the present invention utilizes a temperature sensor that provides an electrical signal that is a known function of temperature. A conductive surface of the object whose temperature is to be measured is incorporated into the electrical circuit that measures the temperature-dependent electrical signal. If the surface is not electrically conductive, a thermally and electrically conductive region is provided, as by plating the surface or bonding a thin sheet of conductive material to the surface.

More specifically, the conductive portion of the surface is contacted at a first location by a portion of the sensor, and at a second, spatially distinct, location by a conductor that is needed to complete the electrical circuit. Unless electrical contact is established at both of these locations, the result is a condition that is readily identifiable. Since electrical contact will only be made if there is good thermal contact, thermal contact is verified by verifying the electrical contact as part of the measurement.

In one embodiment, the sensor is based on a thermocouple where the conductive portion of the surface is contacted at the two spaced locations by the respective distal ends of first and second wires of dissimilar metals. Alternatively, the distal ends of the first and second wires can contact the conductive portion of the surface through additional regions of other conductive material, so long as the additional regions of other conductive material are at the same temperature as the conductive portion of the surface. The voltage between the respective proximal ends of the two wires is measured, providing an indication of the temperature where the distal ends contact the metallic layer. As in known thermocouple measurements, compensation can be made for the junction formed where the proximal ends contact the voltage measuring circuitry.

In another embodiment the sensor is a metal-housed solid-state sensor of the type that generates an output voltage that is a known function of temperature. This output voltage is generated between an output terminal and the metal housing. The conductive portion of the surface is contacted at one of the spaced locations by the metal housing and at the other by a probe. The voltage is measured between the sensor's output terminal and the probe.

In a specific application, the temperature to be measured is the exterior surface of a cylindrical glass reaction vessel. For this application, the vessel is provided with a conductive coating, preferably in the form of a band extending circumferentially around the vessel.

A further understanding of the nature and advantages of the present invention may be realized by reference to the remaining portions of the specification and the drawings.

DESCRIPTION OF SPECIFIC EMBODIMENTS

System Overview

Figure 1:
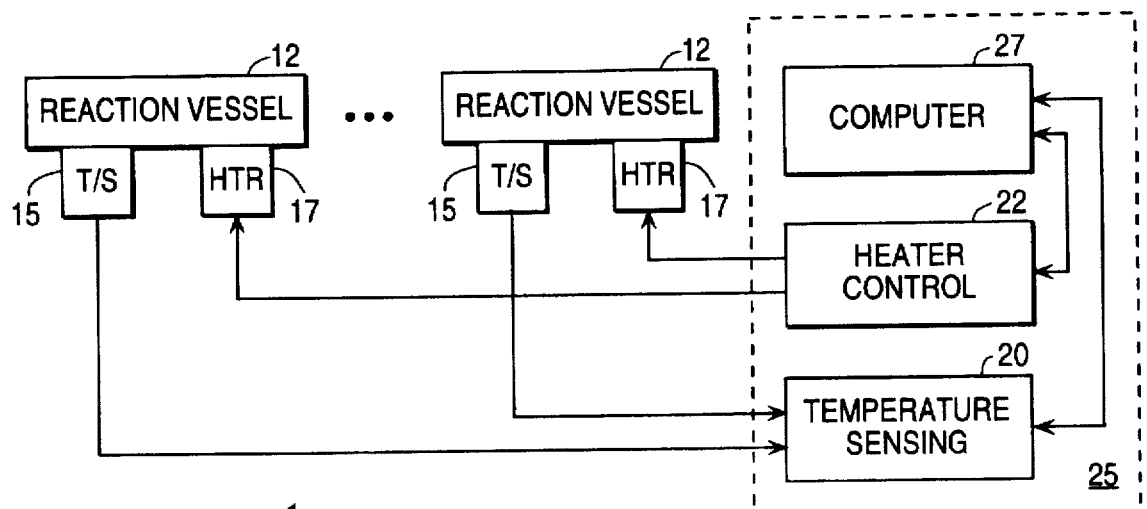
FIG. 1 is a high-level block diagram of a system incorporating the present invention.

FIG. 1 is a high-level block diagram of a system 10 incorporating the temperature sensing of the present invention. While the temperature sensing techniques of the invention have wide applications, the specific environment described here is monitoring the temperatures of a plurality of reaction vessels 12 in a chemical process environment to an accuracy on the order of 3° C. or better. In a current implementation there are eight reaction vessels. This environment presents the need for temperature sensing and control, and to that end, each reaction vessel has an associated temperature sensor 15 and heater 17. A temperature sensor circuit 20 responds to signals from temperature sensors 15, and a heater control circuit 22 generates control signals for heaters 17.

In a specific embodiment, the temperature sensing circuit and heater control circuit are portions of a control circuit 25, which is responsible for overall process control and performs additional functions such as operating valves and pumps to introduce reagents into the reaction vessels and withdraw reaction products therefrom. Control circuit 25 includes a computer 27, which communicates with temperature sensing circuit 20 and heater control circuit 22. The heater control aspects of the system are not part of the present invention, and will not be discussed further.

The computer is programmed to manipulate data representing raw digitized voltages. This includes correcting such voltages for instrument effects, as well as converting corrected voltage values to the desired temperature values. This will be described in detail below.

As will be described below, the present invention overcomes the problem of possibly unreliable measurements due to poor thermal contact between the temperature sensor and the outside of the reaction vessel. This is accomplished by making a portion of the outer surface of each reaction vessel conductive and contacting the conductive surface at two spatially distinct (i.e., spaced) locations to perform the measurement. If the electrical contact is sound, the thermal contact will be sound as well. If the thermal contact is not sound, this will manifest itself as poor electrical contact, which is detected. Two embodiments are described below, a thermocouple-based embodiment and an embodiment using a solid state temperature sensor.

Thermocouple-Based Embodiment

Figure 2:
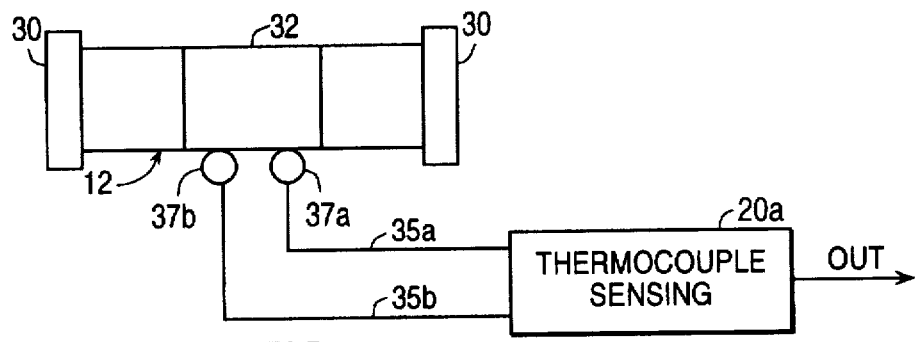
FIG. 2 is a schematic of a thermocouple-based temperature sensing embodiment of the invention.

FIG. 2 is a schematic of one of the reaction vessels and its associated temperature sensor in a thermocouple-based embodiment. Traditional thermocouple approaches use a single probe that includes a thermocouple junction, and contact that probe with the object whose temperature is to be measured. This embodiment of the present invention, on the other hand, incorporates a conductive surface of the object whose temperature is to be measured into the thermocouple circuit. To this end, reaction vessel 12, assumed to be a cylindrical glass vessel with removable end caps 30, is provided with a conductive region 32 on a portion of its outer surface. In the specific embodiment, the conductive region is a circumferentially extending band.

A pair of thermocouple wires 35a and 35b, made of dissimilar metals, are used for the measurement. In a specific embodiment, the wires are copper and constantan (a coppernickel alloy) to define an ANSI-type T thermocouple. This type of thermocouple is widely used, and is suitable for measuring temperatures over an expected range of −100° C. to +200° C. For higher temperatures, other types such as iron and constantan (type J) or nickel-chromium and nickel-aluminum (type K) could be used.

Each wire has a proximal end and a distal end. The distal ends, which may be formed into shaped contacts, designated 37a and 37b, are caused to contact conductive region 32 at two spatially distinct locations. Thus, the two distal ends may be thought of as defining two probes. The two proximal ends are maintained at a reference temperature and the voltage between them is measured by a thermocouple sensing circuit designated 20a. The voltage, suitably manipulated, provides a measure of the temperature of conductive region 32, which provides a predictable approximation of the temperature of the reagent in the vessel.

Actually, it is not necessary that the distal ends of thermocouple wires contact conductive region 32 directly, so long as they contact conductive elements that are at the same temperature as conductive region 32. Thus the distal ends of the thermocouple wires can be permanently attached to contacts of other conductive material, and these contacts would be brought into contact with conductive region 32. Probes 37a and 37b could thus be formed of other than the thermocouple materials. For example, both could be copper. The accuracy of the measurement is not impaired so long as the actual distal ends of the thermocouple wires are at the same temperature as conductive region 32.

As in the case of prior art techniques, a reliable measurement depends on the thermocouple probe making good thermal contact with the surface of the vessel. In the prior art, this requirement gives rise to a major problem, namely that of determining whether the probe is measuring the surface temperature, or the ambient temperature near the surface. The measured thermocouple voltage will be within an acceptable range for both cases. However, with the present invention, a lack of adequate thermal contact leads to a lack of adequate electrical contact to complete the electrical circuit. The result is an abnormally high impedance at sensing circuit 20, which can be recognized.

Thermocouple Sensing Circuit and Temperature Computations

Figure 3:
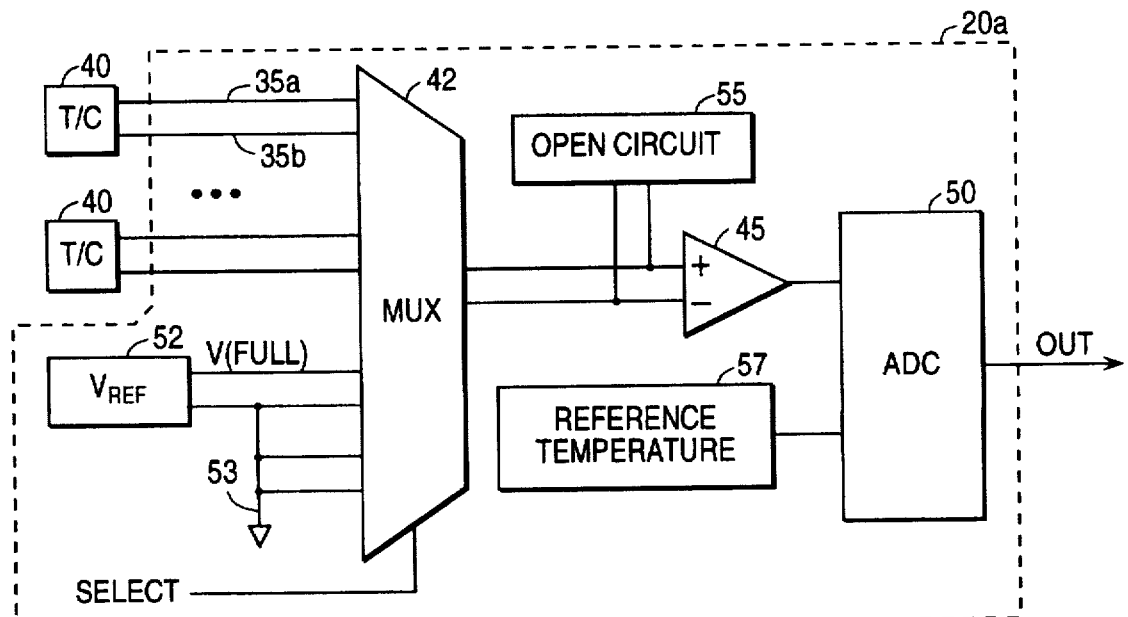
FIG. 3 is a block diagram of thermocouple sensing circuitry according to an embodiment of the invention.

FIG. 3 is a block diagram of thermocouple sensing circuit 20a. Since the thermocouple voltages are sometimes on the order of microvolts, noise can be a significant problem. Therefore, the circuit may be fully differential, as shown, to provide common-mode noise rejection. In a current implementation, the circuit is not differential.

In operation, an appropriate one of the multiple voltages from thermocouples 40 is selected by a multiplexer 42, amplified by an amplifier 45, and digitized by an analog-to-digital converter (ADC) 50. In the illustrated embodiment, the ADC has a plurality of input channels, any desired one of which may be selected under software control. A MAX186 8-channel serial 12-bit ADC available from Maxim can be used.

The sensing circuit performs a number of functions beyond merely sensing the voltage between the proximal ends of thermocouple wires 35a and 35b. To perform these functions, sensing circuit 20a also includes reference voltage circuits 52 and 53 for correcting measured voltages for gain and offset errors and drift, a circuit 55 for use in testing whether the thermocouple wires are in contact with the reaction vessel, and a reference temperature measuring circuit 57 for providing a measurement of the temperature at the proximal ends of the thermocouple wires. Various computations convert the ADC output value to a temperature, as will be described below.

As is well known in the thermocouple art, connecting the thermocouple wires to the sensing circuit has the effect of creating an additional thermocouple junction. This junction introduces a voltage of opposite sense to the voltage of interest, i.e., the voltage that represents the temperature difference between the distal and proximal ends of the wires. It is thus necessary to measure the temperature at the proximal ends of the wires to determine the equivalent reference junction voltage so that it can be added back to the measured voltage.

Reference voltage circuit 52 provides a stable known internal reference voltage V(full) that corresponds to a full scale thermocouple voltage (6.7 mV, which approximately corresponds to 150° C. in a specific embodiment). In the specific embodiment, this reference voltage is provided by a voltage divider defined by highly stable resistors (closely matched temperature dependence) and a stable supply voltage. This internal reference voltage, when amplified and digitized, provides an ADC value AD(full). Reference voltage circuit 53 provides a voltage representing zero input voltage, which when amplified and digitized, provides an ADC value AD(zero). These two values are periodically measured under software control to allow digital cancellation of various spurious effects. These include the effects of gain and offset drift in the amplifier and the effect of circuit 55. The raw thermocouple voltage V(raw), when amplified and digitized, provides an ADC value AD(raw). A corrected voltage V(corr), corrected for gain and offset drift in the amplifier, is given as follows:

$$V(corr)=Vcalib * [(AD(raw)-AD(zero))/(AD(full)-AD(zero))]$$

where Vcalib is a calibration term. Vcalib can be determined by applying a known external reference voltage V(xref) as a thermocouple input voltage, determining the ADC value AD(xref), and substituting into the above equation, which becomes:

$$V(xref)=Vcalib * [(AD(xref)-AD(zero))/(AD(full)-AD(zero))]$$

This equation can be solved for Vcalib, which nominally equals the internal reference voltage V(full) in volts.

Temperature measuring circuit 57 can include any device that provides an output voltage that varies in a known way with temperature. In a specific embodiment, reference temperature measuring circuit 57 is a solid state sensor such as an LM35Precision Centigrade Temperature Sensor, available from National Semiconductor. The device is a three-terminal (supply, ground, output) integrated circuit device that provides an output voltage of 10 mv/°C. The output voltage from the temperature sensor is applied directly to one of the channels of ADC converter 50. The ADC value from the temperature sensor is converted to a voltage based on the ADC's known properties (reference voltage and full number of counts). This is then converted to a temperature based on the known characteristics of the sensor (e.g., divide the voltage in millivolts by 10 to obtain °C. for the specific LM35 device).

This temperature is then converted to an equivalent thermocouple voltage using the voltage/temperature function for the appropriate type of thermocouple junction. The resulting reference junction thermocouple voltage is then added to the corrected thermocouple voltage V(corr) to provide a thermocouple voltage that represents the voltage difference between the proximal ends that would have resulted if the measurement hadn't introduced another thermocouple junction. This voltage is then converted to a temperature based on the reference junction temperature and the temperature/voltage function for the appropriate type of thermocouple junction.

Testing for Poor Contact Between Probes and Vessel

As mentioned above, one aspect of the invention is the ability to test for inadequate thermal contact between the thermocouple probes and the conductive portion of the reaction vessel by testing for inadequate electrical contact. In a specific embodiment, circuit 55 includes a high-impedance 10-mv voltage source, implemented as high-value (say 500K) pullup resistor coupled to the connection point of a voltage divider comprising 1K and 499K resistors coupled between 5 volts and ground.

In the specific embodiment, the thermocouple wires have a resistance on the order of a few ohms while multiplexer 42 adds on the order of 100 ohms. In view of this relatively low impedance of the thermocouple circuit, the 10-mv voltage source will not be sensed by the amplifier when the thermocouple probes are making good contact with the reaction vessel. On the other hand, if one of the probes fails to make contact, the result is an open circuit. The 10-mv source then acts effectively at the amplifier input, and causes an abnormally high output voltage, which can be detected in a test.

While it is true that a fully open circuit will lead to a voltage that is clearly out of bounds, there are intermediate situations of marginal contact that can lead to a voltage that is within the permitted range. Therefore, testing for a high impedance at the input terminals of amplifier 45 normally entails more than merely testing the voltage at the output of ADC 50. For reasons discussed below, a measurement is considered valid only if the voltage and the noise are within certain bounds.

In the specific embodiment, the thermocouple voltages from thermocouple sensors for eight reaction vessels are cyclically sampled approximately five times per second and the multiplexer is switched every 20 ms. Amplifier 45 is required to have sufficient bandwidth to allow full settling of the signal after the multiplexer channel changes. In the specific embodiment, the amplifier has a bandwidth on the order of 1 kHz. As is well known, white noise is proportional to the square root of the bandwidth. When the impedance across the amplifier's input terminals increases (due to poor or non-existent contact with the object being measured), noise inherent to the pullup resistor and the floating inputs to the amplifier manifests itself as an increase in signal fluctuations, even when the average signal is still within a reasonable range.

In order to detect when the signal is sufficiently noisy to render the quality of the contact suspect, the computer averages the readings for each reaction vessel, and determines a quantity representing noise in the system for each of the reaction vessels. This quantity could be the standard deviation, but for simplicity and speed of computation, the difference between the maximum and minimum values for a given number of samples can be used.

It should be recognized that the definition of what constitutes a suspicious level of noise is specific to the design and implementation of the circuit, and further depends on the application at hand, for example, the desired level of sensitivity to possibly inadequate contact.

A given circuit design and implementation will have generally determinable noise characteristics. The amount of noise that is inherent to the circuit itself can be determined empirically during factory calibration of the instrument by shorting all the inputs and measuring signal fluctuations. The criterion according to which fluctuations will be flagged as suspicious can then be defined in terms of the total noise relative to the noise inherent in the circuit.

This can be a fixed criterion, such as a multiple of the measured inherent noise, or the user can be allowed to select a desired level of sensitivity. For example, setting a threshold of total noise equal to twice the inherent noise would be very sensitive, but could result in a large number of false alarms. In a specific circuit implementation, the values for a given reaction vessel vary over at most a few counts for the 12-bit ADC when the contact between the probes and the reaction vessel is known to be good. For this particular implementation, a threshold for fluctuations on the order of 10 counts has been found to be define a suitable criterion.

Solid State Sensor Embodiment

Figure 4:
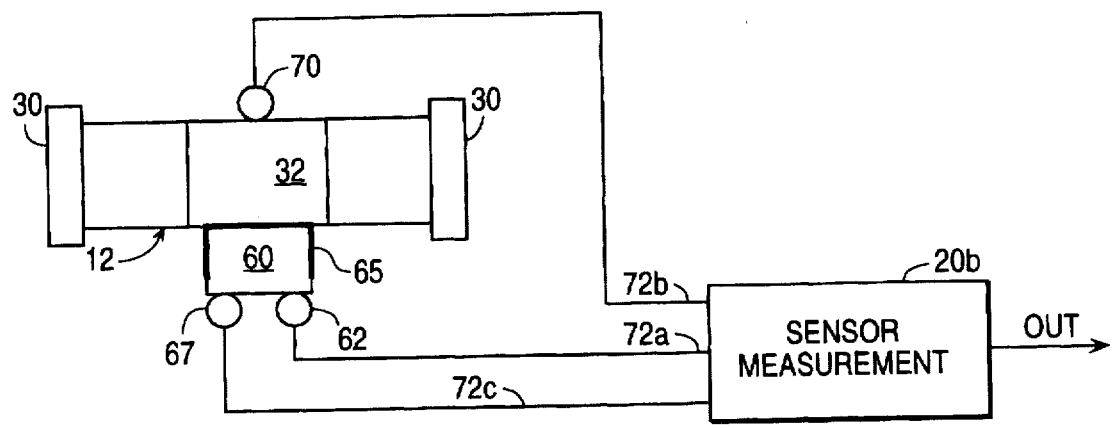
FIG. 4 is a schematic of a temperature sensing embodiment of the invention based on a solid state temperature sensor.

FIG. 4 is a schematic of one of reaction vessels 12 and its associated solid state temperature sensor, designated 60. Sensor 60 may be a solid state device such as described above in connection with the thermocouple-based embodiment. A particular version of the sensor that can advantageously be used provides its temperature dependent voltage between an output terminal 62 and a metal housing 65, which is normally grounded. The device's voltage supply terminal is designated 67. The sensor chip is in intimate thermal and electrical contact with the interior of the housing.

In this embodiment, housing 65 contacts conductive region 32 at a first location and a probe 70 contacts the conductive region at a second location spaced from the first. A sensor voltage measuring circuit, designated 20b, is coupled via conductors 72a, 72b, and 72c to sensor output terminal 62, probe 70, and sensor supply voltage terminal 67, respectively. Circuit 20b supplies the necessary supply voltage to the sensor via conductor 72c and the necessary ground level to probe 70 via conductor 72b, and measures the voltage at sensor output terminal 62. As long as housing 65 and probe 70 both make good contact with the conductive region on the reaction vessel, a temperature-dependent voltage will be detected. If the contact between conductive region 32 and either of housing 65 or probe 70 is poor, sensor 60 will not be grounded, and will provide an output voltage that approaches the supply voltage. This is well above the expected range of voltages (a maximum of about 1.5 volts for a temperature of 150° C.) and can be detected by a test.

Figure 5:
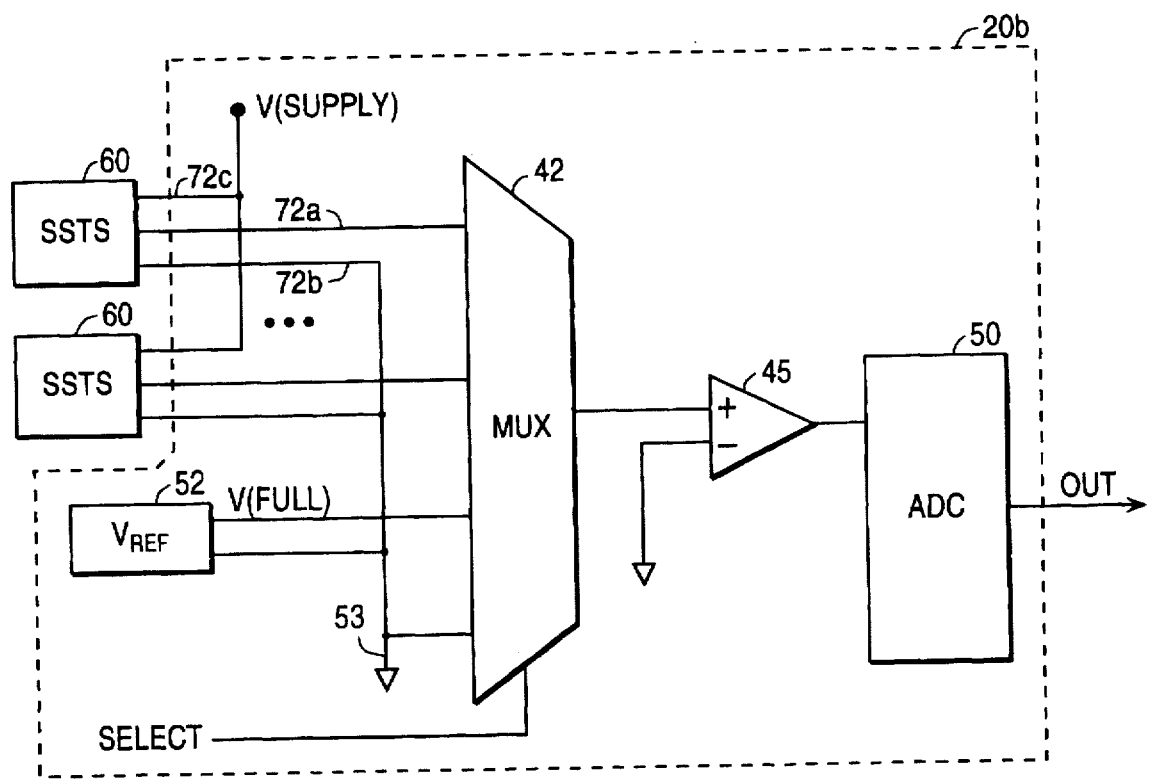
FIG. 5 is a is a block diagram of solid state sensor voltage measurement circuitry according to an embodiment of the invention.

FIG. 5 is a block diagram of solid state sensor voltage measuring circuit 20b. The circuit differs from circuit 20a in FIG. 3 in a number of respects. For example, there is no need for a reference temperature measuring circuit since sensor 60 provides an output voltage that provides a direct measurement of temperature. Since the signal voltages are sufficiently large that noise is less of a problem, the circuit is unlikely to be differential. Indeed, amplifier 45 can be considered optional. Further, the condition of poor electrical contact leads to an abnormally high output voltage without the need for a separate circuit such as circuit 55 in FIG. 3.

Poor contact, even where the voltage reading is within an acceptable range, will still result in a noisier measurement. Therefore, it is preferred to make several measurements and extract a quantity representing noise as described above in connection with the thermocouple embodiment.

Representative Mechanical Arrangements

For either of the above embodiments, it is desirable to provide a mechanism for biasing the probes against conductive portion 32 of the reaction vessel. For the thermocouple embodiment, the relevant probes are probes 37a and 37b, which are the distal ends of the thermocouple wires 35a and 35b, or, as discussed above, probes made of other conductive material, so long as there is substantially no temperature gradient in the probes. For the solid state temperature sensor embodiment, the relevant probes are sensor case 65 and grounded probe 70.

Figure 6:
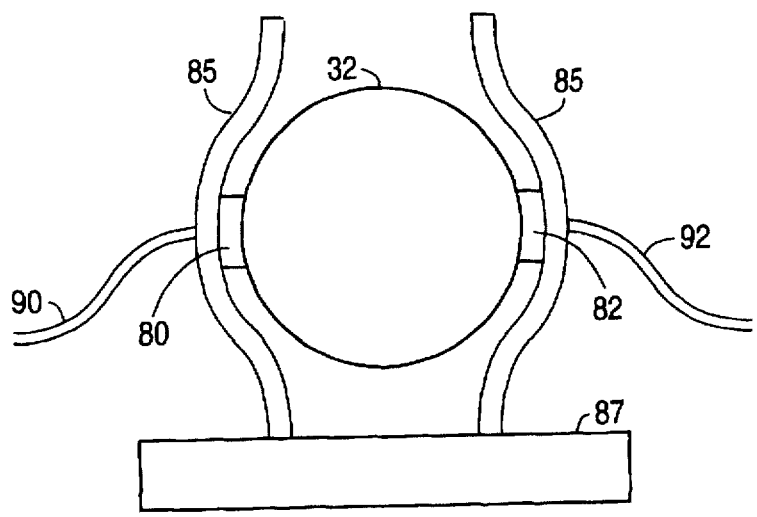
FIG. 6 is a schematic end view of a first mechanical arrangement for biasing the probes against the object whose temperature is to be measured.

FIG. 6 is a schematic end view of a first mechanical arrangement for biasing the probes, designated generically as 80 and 82. The probes are mounted to a pair of facing resilient brackets 85, which are mounted to a base 87. A pair of conductors, designated generically as 90 and 92 are seen leading from the probes. The brackets have a rest position in which the probes are separated by less than the diameter of the reaction vessel's conductive region. Accordingly, when the reaction vessel is inserted between the probes, the brackets are moved outwardly and provide a resisting force that biases the probes against the conductive region of the vessel.

For the thermocouple embodiment, probes 80 and 82 correspond to probes 37a and 37b, and conductors 90 and 92 correspond to thermocouple wires 35a and 35b. If the probes are made of something other than the two thermocouple metals, they should be thermally insulated so that they maintain the same temperature as conductive region 32 of the reaction vessel.

For the solid state sensor embodiment, probes 80 and 82 correspond to case 65 of the sensor and grounded probe 70. In this case, conductor 90 corresponds to the pair of conductors 72a and 72c, which are not connected to case 65, but rather to the other two terminals of the sensor. Conductor 92 corresponds to conductor 72b.

Figure 7A:
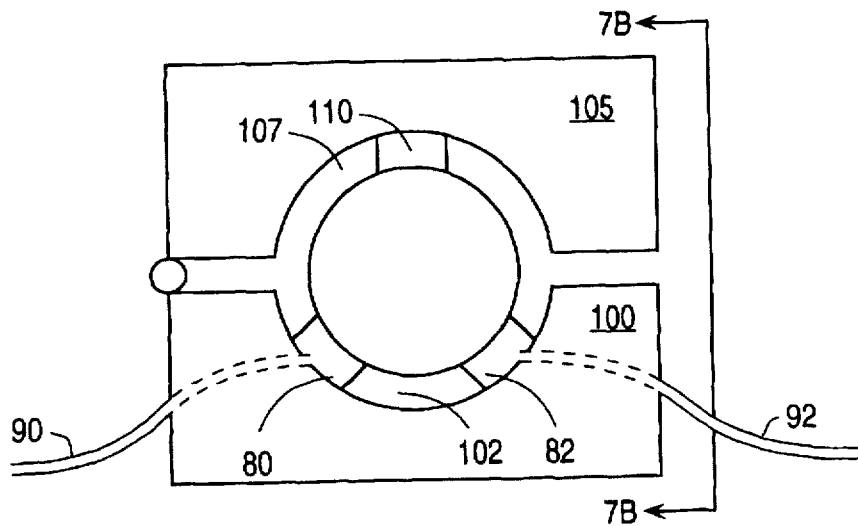
FIGS. 7A and 7B are schematic end and side views of a second mechanical arrangement for biasing the probes.
Figure 7B:
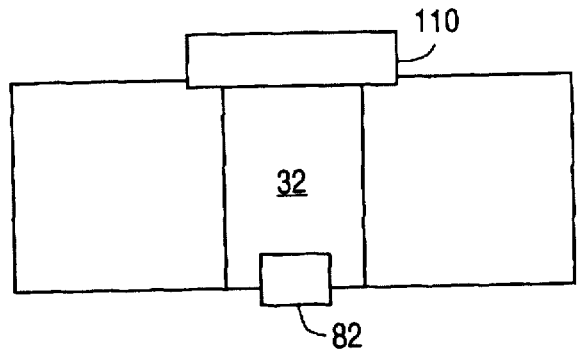

FIGS. 7A and 7B are schematic end and side views of a second mechanical arrangement for biasing the probes. The probes and conductors are designated as in FIG. 6, and have the same significance. In this arrangement, the probes are mounted to a base 100, and protrude upwardly into a concave upwardly facing region 102. A door 105 is hinged to base 100, and has a downwardly facing concave region 107, which faces downwardly when the door is closed over the base. A resilient element 110 is mounted to concave region 105 and biases the vessel against the probes when the door is closed. For simplicity, the base and door are not shown in FIG. 7B. It would also be possible to have the probes mounted to the door and the resilient element mounted to the base, but this would require that the conductors be subject to movement, which is not generally desirable.

Conclusion

In conclusion, it can be seen that the present invention provides reliable contact-based temperature measurements without having to bond probes to the surface of objects being measured while still providing verification of the reliability of the measurement.

While the above is a complete description of specific embodiments of the invention, various modifications, alternative constructions, and equivalents may be used. For example, while a voltage pullup resistor was described for the open circuit sensing, a current source could also be used, and would have the advantage of obviating the need for a high-value resistor and its associated noise. Therefore, the above description should not be taken as limiting the scope of the invention as defined by the claims.

What is claimed is:

1. A method of determining temperature in a vessel having an electrically non-conductive exterior surface, the method comprising the steps of:

providing an electrically conductive layer in intimate thermal contact with an exterior surface portion of the vessel;

providing first and second wires made of dissimilar metals, each wire having proximal and distal ends;

contacting the conductive layer at first and second spatially distinct locations with first and second probes formed at the respective distal ends of the first and second wires, the first and second probes defining an open circuit prior to said step of contacting the conductive layer, a portion of the conductive layer between the first and second spatially distinct locations, when contacted by the probes, providing an electrical path between the first and second probes and further being incorporated into a thermocouple circuit;

measuring a voltage between the proximal ends of the first, and second wires; and converting the voltage, so measured, into a temperature.

2. The method of claim 1 wherein said step of providing the conductive layer includes plating the exterior surface portion of the vessel with a selected conductive material.

3. The method of claim 1 wherein said step of providing the conductive layer includes bonding a sheet of a selected conductive material to the exterior surface portion of the vessel.

4. The method of claim 1 wherein said step of contacting includes:

mounting the probes to a fixed structure; and mechanically biasing the conductive layer on the exterior surface portion of the vessel against the probes.

5. The method of claim 1, and further including the step of determining whether there is a high impedance between the probes.

6. The method of claim 1, and further including the steps of:

applying an additional voltage through a high-impedance source between the proximal ends of the first and second wires, the additional voltage having a value that, when converted to a temperature, gives a temperature that is above the maximum expected temperature; and determining whether the temperature from said converting step is above the maximum expected temperature, indicating a high impedance between the probes.

7. The method of claim 1, and further including the steps of:

injecting a current into the proximal end of one of the first and second wires, so that when there is a high impedance between the probes, the current causes a measured voltage having a value that, when converted to a temperature, gives a temperature that is above the maximum expected temperature; and determining whether the temperature from said converting step is above the maximum expected temperature, indicating a high impedance between the probes.

8. The method of claim 1, and further including the steps of:

performing said measuring and converting steps a plurality of times to provide a plurality of temperature measurements; and determining whether the plurality of temperature measurements exhibit statistical fluctuations that meet a criterion indicating a high impedance between the probes.

9. A method of measuring temperature in a vessel having an electrically non-conductive exterior surface, the method comprising the steps of:

providing an electrically conductive layer in intimate thermal contact with an exterior surface portion of the vessel;

providing a temperature sensor having first and second, input terminals and an output terminal, the sensor generating a temperature-dependent voltage between the output terminal and the first input terminal when a voltage within a range designated suitable is applied across the first and second input terminals, the sensor having an associated metallic element in thermal contact with the sensor and in electrical contact with the first input terminal;

providing an electrically conductive probe;

supplying a voltage in the range designated suitable between the second input terminal and the probe;

contacting the conductive layer at first and second spatially distinct locations with the metallic element and the probe, respectively, the metallic element and the probe defining an open circuit prior to said step of contacting the conductive layer, a portion of the conductive layer between the first and second spatially distinct locations, when contacted by the metallic element and the probe, providing an electrical path between the metallic element and the probe so as to complete the electrical circuit between the probe and the first input terminal and thereby cause the voltage supplied between the second input terminal and the probe to be applied across the first and second input terminals;

measuring a voltage between the sensor's output terminal and the probe; and converting the voltage, so measured, into a temperature.

10. The method of claim 9 wherein said step of providing the conductive layer includes plating the exterior surface portion of the vessel with a selected conductive material.

11. The method of claim 9 wherein said step of providing the conductive layer includes bonding a sheet of a selected conductive material to the exterior surface portion of the vessel.

12. The method of claim 9 wherein said step of contacting includes:

mounting the probe and the sensor to a fixed structure; and mechanically biasing the conductive layer on the exterior surface portion of the vessel against the probe and the metallic element of the sensor.

13. The method of claim 9, and further including the step of determining whether the voltage, so measured falls within a specific range indicating high impedance between the probe and the sensor's metallic element.

14. The method of claim 9, and further including the steps of:

performing said measuring and converting steps a plurality of times to provide a plurality of temperature measurements; and determining whether the plurality of temperature measurements exhibit statistical fluctuations that meet a criterion indicating a high impedance between the probes.

15. The method of claim 9, wherein:

the sensor is solid state temperature sensor; and the sensor's metallic element is a housing.

16. A method of measuring temperature of an electrically conductive surface, the method comprising the steps of:

providing a solid state temperature sensor having first and second input terminals and an output terminal, the sensor generating a temperature-dependent voltage between the output terminal and the first input terminal when a voltage within a range designated suitable is applied across the first and second input terminals, the sensor being disposed in and in thermal contact with a metallic case, the metal case being in electrical contact with the first input terminal;

providing an electrically conductive probe;

supplying a voltage in the range designated suitable between the second input terminal and the probe;

contacting the conductive surface at first and second spatially distinct locations with the case and the probe, respectively, the case and the probe defining an open circuit prior to said step of contacting the conductive surface, a portion of the conductive surface between the first and second spatially distinct locations, when contacted by the case and the probe, providing an electrical path between the case and the probe so as to cause the voltage supplied between the second input terminal and the probe to be applied across the first and second input terminals;

measuring a voltage between the sensor's output terminal and the probe; and converting the voltage, so measured, into a temperature.

17. The method of claim 16 wherein said step of contacting includes:

mounting the probe and the sensor to a fixed structure; and mechanically biasing the conductive layer on the exterior surface portion of the vessel against the probe and the metallic element of the sensor.

18. The method of claim 16, and further including the step of determining whether the voltage, so measured falls within a specific range indicating high impedance between the probe and the sensor's metallic element.

19. The method of claim 16, and further including the steps of:

performing said measuring and converting steps a plurality of times to provide a plurality of temperature measurements; and determining whether the plurality of temperature measurements exhibit statistical fluctuations that meet a criterion indicating a high impedance between the probes.

* * * * *